United States Patent [19]

Reynolds et al.

[11] 4,243,424
[45] Jan. 6, 1981

[54] PROCESS FOR THE PRODUCTION OF DEAD BURNED REFRACTORY MAGNESIA

[75] Inventors: Jack B. Reynolds, Midland; Charles R. Amos, Auburn, both of Mich.

[73] Assignee: The Dow Chemical Company, Midland, Mich.

[21] Appl. No.: 960,382

[22] Filed: Nov. 13, 1978

[51] Int. Cl.³ ............................................. C01F 5/02
[52] U.S. Cl. ..................................... 106/58; 423/636
[58] Field of Search .................. 423/155, 636; 106/58

[56] References Cited

U.S. PATENT DOCUMENTS

| 2,478,593 | 8/1949 | Pike | 423/636 |
| 3,471,259 | 10/1969 | Sese | 423/636 |
| 3,965,240 | 6/1976 | Hughey | 423/636 |

FOREIGN PATENT DOCUMENTS

| 1646674 | 2/1971 | Fed. Rep. of Germany | 423/636 |
| 45-1182 | 1/1970 | Japan | 423/636 |

*Primary Examiner*—O. R. Vertiz
*Assistant Examiner*—Wayne A. Langel
*Attorney, Agent, or Firm*—J. M. Kuszaj

[57] ABSTRACT

High density, dead burned refractory magnesia (MgO) is produced by sintering compacts formed by simultaneously thermally dehydrating and mechanical working an aqueous slurry of magnesium hydroxide.

8 Claims, No Drawings

PROCESS FOR THE PRODUCTION OF DEAD BURNED REFRACTORY MAGNESIA

BACKGROUND OF THE INVENTION

The present invention relates generally to the production of high density, dead burned magnesia (MgO). More in particular, it relates to the production of dead burned magnesia directly from an aqueous magnesium hydroxide slurry in a single burning step.

It is well known that dead burned refractory magnesia can be prepared from an aqueous magnesium hydroxide slurry by heating the slurry to achieve decomposition of magnesium hydroxide to magnesium oxide, followed by the densification of the magnesium oxide to the refractory grain material.

One conventional method of producing dead burned refractory magnesia is known as the "double burning+" or "two-stage" process. This process involves; (1) heating (calcining) the magnesium hydroxide slurry at a temperature of from about 900° C. to about 1200° C. to produce a chemcially reactive oxide of magnesia; (2) compacting the thus calcined magnesia in a high pressure briquetting roller; and (3) dead burning (sintering) the briquettes in a rotary or shaft kiln at a temperature of from about 1500° C. to about 2000° C. A general description of a "double burning" process of producing dead burned refractory magnesia is described in greater detail in U.S. Pat. No. 3,060,000.

Although the "double burning" process can produce dead burned refractory magnesia of acceptable quality, the process suffers from a number of disadvantages. Among the disadvantages are: excessive dust formation during the briquetting and calcining steps; high wear of the briquetting machine due to the abrasive nature of the calcined magnesia; fragility of the magnesia briquettes which necessitates special care in handling equipment during the sintering process; and the necessity of providing two high energy burning operations, i.e. calcining and sintering.

Another known process for the production of dead burned refractory magnesia is described in U.S. Pat. No. 4,033,778. This process involves the dewatering and compaction of magnesium hydroxide sludge by the application of pressure. The magnesium hydroxide filter cake obtained by pressure filtration can be directly dead burned to refractory magnesia. This process has the disadvantage of yielding granular dead burned magnesia having a density of only about 3.2 to about 3.35 grams per cubic centimeter (g/cc), depending upon the impurities in the initial starting material.

Another process for producing dead burned refractory magnesia is described in U.S. Pat. No. 3,378,615 and in the publication "Development of New Process for Sea Water Magnesia Production", by R. T. Randle, H. Heasman, and W. C. Gilpin, *Refractories Journal*, pages 13-17. This process involves first removing some of the free water content from an aqueous magnesium hydroxide solution and then folding, mixing, and kneading the resulting paste. This process results in a magnesium hydroxide cake containing less than 75 percent solids which may be dead-burned to a refractory product. However, the process described in U.S. Pat. No. 3,378,615 is unsatisfactory because unless the free water content of the starting material is controlled, prior to the kneading operation, within a well defined range, the subsequent firing operation produces a large amount of undesirable dust. Moreover, the *Refractories Journal* article reports that when the percent solids in the magnesium hydroxide cake exceeds 75 percent by weight, the cake crumbles when kneaded and both the grading and the density of the fired cake rapidly decreases.

It would be desirable, therefore, to produce a dead burned refractory magnesia of high density in a single burning operation without the necessity of a calcining step. Ideally, this method should produce magnesia having a density at least as great as, and preferably substantially greater than, the conventional processes.

SUMMARY OF THE INVENTION

The present invention is a method for producing in a single burning step a high density, dead burned, refractory magnesia from an aqueous slurry of magnesium hydroxide. The process comprises: (a) simultaneously thermally dehydrating and mechanically working the aqueous slurry with a compressive-shearing force to form coherent compacts of magnesium hydroxide containing at least about 75 percent by weight solids; and (b) sintering the compacts at a sufficient temperature to form a dead burned refractory magnesia.

The method of the present invention is advantageous because it allows the production of dead burned refractory magnesia of high density directly from an aqueous slurry of magnesium hydroxide by the use of a single dead-burning step without the necessity of an intervening mild burning (calcining) step. The dead burned refractory material produced has a density at least as great as, and oftentimes substantially greater than, material produced by conventional processes. Moreover, the present process can result in a reduction in equipment and energy cost compared to the conventional processes.

DETAILED DESCRIPTION OF THE INVENTION

Aqueous slurries of magnesium hydroxide treated by the present method can be derived from a number of sources. For instance, the slurry may be obtained by treating solutions containing magnesium ions, for example, brine, sea water, and the like, with an alkali, such as dolime, and separating the precipitate of magnesium hydroxide. The present method is particularly suited for use with slurries of magnesium hydroxide produced in accordance with the teachings of U.S. Pat. No. 3,080,215, which publication is incorporated herein by reference.

Magnesium hydroxide slurries obtained by commercial processes such as U.S. Pat. No. 3,080,215, generally have a water content of from about 30 to about 60 percent by weight and a magnesium hydroxide solids content of from about 40 to about 70 percent by weight. Thus, it is generally preferred to at least partially dewater the slurry before employing the present method. This initial dewatering step involves feeding the slurry to a conventional filtering means, e.g., a vacuum type filter, to remove at least a portion of the free water content of the magnesium hydroxide. Generally, the magnesium hydroxide slurry after filtration contains about 40 to 70 percent solids, and about 30 to 60 percent free water.

The slurry is then simultaneously at least partially thermally dehydrated and mechanically worked by the action of a compressive-shearing force. The dehydration and working can be conducted in any apparatus which allows both heat and work to be applied simultaneously to an aqueous slurry. Illustrative of such an apparatus is a steam-jacketed Readco brand sigma blade mixer.

The dehydration is achieved by heating the magnesium hydroxide slurry to a temperature sufficient to remove at least a portion of its free water as steam. Preferentially, the aqueous slurry is dehydrated by heating the slurry in a steam-jacketed vessel in which the steam is at a temperature of from about 100° C. to about 135° C., and preferably at a temperature of from about 108° C. to about 132° C. It has generally been found undesirable to employ temperatures in excess of 135° C., since the magnesium hydroxide tends to form an excess amount of fine particulates which are not suitable for forming compacts.

While the magnesium hydroxide slurry is being thermally dehydrated by the application of heat, it is simultaneously being mechanically worked. The rate of dehydration and the rate of application of mechanical work are controlled so that the magnesium hydroxide is formed into compacts suitable for sintering. Preferably, the rate of dehydration is substantially the same as the rate of application of mechanical work. The mechanical working is in the nature of the application of a compressing and shearing force to the magnesium hydroxide slurry, preferably, by the action of mixing tools. The working action can be described more fully as a combination of bulk movement, smearing, stretching, folding, dividing, and recombining as the material is pulled and squeezed against blades, saddles, and sidewalls. Any device which achieves this type of working action is suitable for use in the present invention. Such devices are described in greater detail in the Chemical Engineers Handbook, Perry and Chilton, Fifth Edition, pages 19-14 to 19-16, which publication is incorporated herein by reference.

The slurry is dehydrated and worked until the magnesium hydroxide solids are formed into coherent compacts containing at least about 75 percent by weight magnesium hydroxide solids and, preferably, from about 75 to about 85 percent by weight magnesium hydroxide slurry. More preferably, the slurry is dehydrated and worked until the magnesium hydroxide solids are formed into coherent compacts containing from about 79 to about 83 percent by weight magnesium hydroxide solids. The compacts formed are hard, dense, substantially spherical pellets. About 95 percent of the pellets have an average particle size greater than about 16 mesh (Tyler Series) and less than about ⅜ inch.

The compacts thus formed are subjected to a standard burning (sintering) operation in which the compacts are heated to a temperature of from about 1500° C. to about 1900° C. to form a dead burned refractory grain material. The sintering of magnesium hydroxide is well known in the art, and any conventionally sintering apparatus can be empolyed. The resulting dead burned refractory magnesia generally has a bulk density of at least about 97 percent of its theoretical bulk density.

For refractory purposes, it may be necessary to form dead burned magnesia compositions which contain other refractory compounds in addition to magnesia. Compounds, such as for example, chromium, may be added to the magnesium hydroxide slurry to produce compositions having the desired properties. Likewise, it may be desirable to add various binders to the magnesium hydroxide slurry to assist in the formation of compacts. Such binders can include, for example, methylcellulose, hydroxyethylmethyl cellulose, starch, silicates, and the like.

The following examples are illustrative of the invention:

EXAMPLE 1

A magnesium chloride-containing brine was treated with a slaked dolomitic slurry to form a precipitate of magnesium hydroxide in suspension. The magnesium hydroxide slurry was filtered in a Moore filter and recovered as a washed filter cake containing about 50 percent by weight magnesium hydroxide. The filter cake was washed with water to remove entrained mother liquor and thereafter reslurried with water to make a pumpable slurry. The slurry was concentrated by vacuum filtration to a filter cake containing about 57.3 percent by weight magnesium hydroxide and about 42.7 percent by weight water.

A 5236 gram sample of the magnesium hydroxide filter cake was "creamed" or "repulped" for about ten minutes by an agitating tank to homogenize or break up the filter cake and agglomerates therein to a uniform slurry consistency.

The resulting slurry was introduced into the interior of steam-jacket, Readco brand sigma blade mixer manufactured by Read Machinery Company, Inc., York, Pa. The blades of the mixer were operated at a constant speed of about 44 revolutions per minute, while about ten pounds (psig) steam pressure was maintained in the steam-jacket to provide a temperature within the mixer of about 117° C.

The magnesium hydroxide slurry was retained within the mixer for approximately 70 minutes. During that time, the magnesium hydroxide agglomerated into compact, rounded pellets. Approximately 94 percent of which had an average particle size greater than about 16 mesh and less than ⅜ inch. The pellets were taken from the mixer at about 10 minute intervals during the 70 minute retention time. The samples were analyzed for magnesium hydroxide content, and then sintered to magnesia. The percent magnesium hydroxide solids within the mixer and density of the sintered magnesia as functions of time are shown in the Table.

The magnesium hydroxide compacts were sintered by firing in a conventional furnace for about one hour at about 1700° C. The bulk density of the sintered material was determined by the standard method of testing for bulk density and porosity of granular refractory materials by mercury displacement (American Society for Testing Material: Designation: C493-70). The sintered magnesia was chemically analyzed and found to contain about 97.3 percent by weight magnesium oxide, and lesser amounts of the oxides of silicon, iron, aluminum, calcium, and boron. The compacts had a density after sintering for one hour of 3.515 g/cc.

COMPARATIVE TEST—A

To demonstrate the degree of densification achieved by the present method, a portion of the magnesium hydroxide slurry of Example 1, was also converted to dead-burned magnesia by conventional two-stage firing technique. In this process, the magnesium hydroxide slurry was calcined at about 900° C., and then pressed into 1¼ inch diameter briquettes. The briquettes were sintered for about 1 hour at about 1700° C. The resulting dead-burned magnesia had a bulk density of about 3.45 g/cc.

EXAMPLE 2

A different magnesium hydroxide slurry was treated substantially as described in Example 1. The sintered magnesia was chemically analyzed and found to contain about 98.6 percent by weight MgO, and lesser amounts of the oxides of silicon, iron, aluminum, calcium, and boron. The boron levels of the magnesia was from about 5 to about 10 times greater than that found in the material of Example 1. The compacts had an average density of 3.35 g/cc after sintering for one hour.

COMPARATIVE TEST—B

To demonstrate the degree of densification achieved by the present method in comparison to a conventional two-stage firing process, a portion of the magnesium hydroxide slurry of Example 2, was treated substantially as described in Comparative Test A. The resulting dead-burned mangesia had a bulk density of about 3.35 g/cc.

The results shown in Examples 1 and 2 and Comparative Tests A and B indicate that the present method is capable of producing in a single burning step dead-burned magnesia having densities at least as great as, and oftentimes greater than the densities achieved by conventional two-stage firing.

TABLE

| Time (Min) | Example 1 % Mg(OH)$_2$ | Density (g/cc) |
|---|---|---|
| 0 | 57.3 | — |
| 35 | 67.0 | 3.219 |
| 40 | 68.8 | 3.228 |
| 45 | 71.4 | 3.277 |
| 50 | 73.4 | 3.368 |
| 55 | 76.3 | 3.390 |
| 60 | 78.1 | 3.465 |
| 63 | 79.1 | 3.502 |
| 66 | 80.4 | 3.514 |
| 70 | 81.8 | 3.515 |

COMPARATIVE TEST - A 3.45 g/cc
THEORETICAL DENSITY 3.58 g/cc

What is claimed is:

1. A method for producing in a single burning step a high density, dead-burned, refractory magnesia from an aqueous slurry of magnesium hydroxide comprising:
   (a) simultaneously thermally dehydrating and mechanically working said aqueous slurry with a compressive-shearing force to form coherent compacts of magnesium hydroxide containing about 75 to about 85 percent by weight solids; and
   (b) sintering said compacts at a sufficient temperature to form a dead-burned refractory magnesia.

2. The method of claim 1 wherein said sintering is at a temperature of from about 1500° C. to about 1900° C.

3. The method of claim 1 wherein the aqueous slurry of magnesium hydroxide contains from about 40 to about 70 percent by weight magnesium hydroxide solids.

4. The method of claim 1 wherein the aqueous slurry is mechanically worked by subjecting said slurry to the action of mixing tools rotating in such a fashion as to smear, stretch, fold, divide, and recombine the slurry as it is pulled and squeezed against blades, and sidewalls.

5. The method of claim 1 wherein the coherent compacts of magnesium hydroxide contain from about 79 to about 83 percent by weight solids.

6. The method of claim 1 wherein the dead-burned refractory magnesia has a bulk density of at least about 97 percent of its theoretical bulk density.

7. The method of claim 1 including the addition step of admixing said aqueous slurry with a binder prior to dehydration and working.

8. The method of claim 1 wherein the rate of dehydration is substantially the same as the rate of application of mechanical work.

* * * * *